United States Patent
Curtis et al.

(10) Patent No.: US 10,252,169 B2
(45) Date of Patent: *Apr. 9, 2019

(54) PROVIDING LEADERBOARD BASED UPON IN-GAME EVENTS

(71) Applicant: Kabam, Inc., San Francisco, CA (US)

(72) Inventors: Matthew Curtis, Novato, CA (US); James Koh, Mountain View, CA (US); Kellen Christopher Smalley, Pleasanton, CA (US); Michael C. Caldarone, Palo Alto, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/877,849

(22) Filed: Jan. 23, 2018

(65) Prior Publication Data

US 2018/0147496 A1    May 31, 2018

Related U.S. Application Data

(63) Continuation of application No. 15/612,967, filed on Jun. 2, 2017, now Pat. No. 9,919,222, which is a
(Continued)

(51) Int. Cl.
*A63F 13/31* (2014.01)
*A63F 13/798* (2014.01)
*A63F 13/352* (2014.01)

(52) U.S. Cl.
CPC ............ *A63F 13/798* (2014.09); *A63F 13/31* (2014.09); *A63F 13/352* (2014.09)

(58) Field of Classification Search
CPC .................................................... A63F 13/798
(Continued)

(56) References Cited

U.S. PATENT DOCUMENTS

| 5,816,918 | A | 10/1998 | Kelly |
| 5,933,813 | A | 8/1999 | Teicher |

(Continued)

FOREIGN PATENT DOCUMENTS

| KR | 1020130137431 | 12/2013 |
| WO | 2002026333 | 1/2002 |

(Continued)

OTHER PUBLICATIONS

Gem System—Street Fighter X Tekken, http://www.streetfighter.com/us/sfxtk/features/gem-system, printed Nov. 6, 2012, 6 pages.
(Continued)

*Primary Examiner* — David L Lewis
*Assistant Examiner* — Shauna-Kay Hall
(74) *Attorney, Agent, or Firm* — Sheppard Mullin Richter & Hampton LLP

(57) ABSTRACT

An approach to facilitate providing leaderboards based upon in-game events within a game space. The leaderboards based on user progress to achieving one or more administrator defined objectives within the game space, where each objective requires the completion of one or more activities. An objective metric for the first user, indicating the first user's progress toward achieving the objective may be determined, based upon one or more activity metric values for the first user. The activity metric values providing an indication of the first user's progress toward completing activities required to be completed to achieve the objective, as defined by an administrator.

18 Claims, 3 Drawing Sheets

Related U.S. Application Data continuation of application No. 14/678,910, filed on Apr. 3, 2015, now Pat. No. 9,669,315, which is a continuation of application No. 13/861,246, filed on Apr. 11, 2013, now Pat. No. 9,007,189.

(58) Field of Classification Search
USPC .......................................................... 463/31
See application file for complete search history.

(56) References Cited

U.S. PATENT DOCUMENTS

| | | |
|---|---|---|
| 5,964,660 A | 10/1999 | James |
| 6,015,344 A | 1/2000 | Kelly |
| 6,142,472 A | 11/2000 | Kliebisch |
| 6,190,225 B1 | 2/2001 | Coleman |
| 6,190,255 B1 | 2/2001 | Thomas |
| 6,347,996 B1 | 2/2002 | Gilmore |
| 6,402,619 B1 | 6/2002 | Sato |
| 6,561,904 B2 | 5/2003 | Locke |
| 6,604,008 B2 | 8/2003 | Chudley |
| 6,745,236 B1 | 6/2004 | Hawkins |
| 6,811,483 B1 | 11/2004 | Webb |
| 6,850,900 B1 | 2/2005 | Hare |
| 6,857,959 B1 | 2/2005 | Nguyen |
| 6,928,474 B2 | 8/2005 | Venkatesan |
| 7,076,453 B2 | 7/2006 | Jammes |
| 7,381,133 B2 | 6/2008 | Thomas |
| 7,533,336 B2 | 5/2009 | Jaffe |
| 7,660,740 B2 | 2/2010 | Boone |
| 7,682,239 B2 | 3/2010 | Friedman |
| 7,785,188 B2 | 8/2010 | Cannon |
| 7,813,821 B1 | 10/2010 | Howell |
| 7,819,749 B1 | 10/2010 | Fish |
| 7,945,802 B2 | 5/2011 | Hamilton, II |
| 7,959,507 B2 | 6/2011 | Cannon |
| 8,010,404 B1 | 8/2011 | Wu |
| 8,016,668 B2 | 9/2011 | Hardy |
| 8,047,909 B2 | 11/2011 | Walker |
| 8,057,294 B2 | 11/2011 | Pacey |
| 8,066,571 B2 | 11/2011 | Koster |
| 8,147,340 B2 | 4/2012 | BrunetdeCourssou |
| 8,157,635 B2 | 4/2012 | Hardy |
| 8,187,101 B2 | 5/2012 | Herrmann |
| 8,226,472 B2 | 7/2012 | Van Luchene |
| 8,231,453 B2 | 7/2012 | Wolf |
| 8,231,470 B2 | 7/2012 | Feeney |
| 8,239,487 B1 | 8/2012 | Hoffman |
| 8,246,439 B2 | 8/2012 | Kelly |
| 8,272,934 B2 | 9/2012 | Olive |
| 8,272,951 B2 | 9/2012 | Ganz |
| 8,272,956 B2 | 9/2012 | Kelly |
| 8,282,491 B2 | 10/2012 | Auterio |
| 8,287,367 B2 | 10/2012 | Hall |
| 8,287,383 B1 | 10/2012 | Etter |
| 8,287,384 B2 | 10/2012 | Auterio |
| 8,292,743 B1 | 10/2012 | Etter |
| 8,313,372 B2 | 11/2012 | Naicker |
| 8,317,584 B2 | 11/2012 | Aoki |
| 8,317,601 B1 | 11/2012 | Luciano, Jr. |
| 8,323,110 B2 | 12/2012 | Shibamiya |
| 8,328,642 B2 | 12/2012 | Mosites |
| 8,332,260 B1 | 12/2012 | Mysen |
| 8,332,544 B1 | 12/2012 | Rails |
| 8,348,716 B2 | 1/2013 | Ganz |
| 8,348,762 B1 | 1/2013 | Willis |
| 8,348,767 B2 | 1/2013 | Mahajan |
| 8,348,768 B2 | 1/2013 | Auterio |
| 8,360,858 B2 | 1/2013 | LaRocca |
| 8,360,867 B2 | 1/2013 | VanLuchene |
| 8,360,868 B2 | 1/2013 | Shvili |
| 8,366,544 B2 | 2/2013 | Walker |
| 8,366,550 B2 | 2/2013 | Herrmann |
| 8,371,925 B2 | 2/2013 | Bonney |
| 8,376,826 B2 | 2/2013 | Katz |
| 8,382,572 B2 | 2/2013 | Hoffman |
| 8,388,427 B2 | 3/2013 | Yariv |
| 8,401,913 B2 | 3/2013 | Alivandi |
| 8,408,989 B2 | 4/2013 | Bennett |
| 8,439,759 B1 | 5/2013 | Mello |
| 8,475,262 B2 | 7/2013 | Wolf |
| 8,506,394 B2 | 8/2013 | Kelly |
| 8,512,150 B2 | 8/2013 | Herrmann |
| 8,583,266 B2 | 11/2013 | Herbrich |
| 8,636,591 B1 | 1/2014 | Hawk |
| 8,696,428 B1 | 4/2014 | Post |
| 8,715,068 B2 | 5/2014 | Arnone |
| 8,777,754 B1 | 7/2014 | Santini |
| 8,784,214 B2 | 7/2014 | Parks |
| 8,790,185 B1 | 7/2014 | Caldarone |
| 8,821,260 B1 | 9/2014 | DeSanti |
| 8,831,758 B1 | 9/2014 | Chu |
| 8,851,978 B1 | 10/2014 | Koh |
| 8,920,243 B1 | 12/2014 | Curtis |
| 8,961,319 B1 | 2/2015 | Pieron |
| 8,968,067 B1 | 3/2015 | Curtis |
| 9,138,639 B1 | 9/2015 | Ernst |
| 9,257,007 B2 | 2/2016 | Santini |
| 9,717,986 B1 | 8/2017 | Kawaguchi |
| 2002/0059397 A1 | 5/2002 | Feola |
| 2002/0072412 A1 | 6/2002 | Young |
| 2002/0094863 A1 | 7/2002 | Klayh |
| 2002/0095327 A1 | 7/2002 | Zumel |
| 2002/0115488 A1 | 8/2002 | Berry |
| 2002/0119824 A1 | 8/2002 | Allen |
| 2002/0151351 A1 | 10/2002 | Baerlocher |
| 2002/0165794 A1 | 11/2002 | Ishihara |
| 2002/0183105 A1 | 12/2002 | Cannon |
| 2002/0193162 A1 | 12/2002 | Walker |
| 2003/0008713 A1 | 1/2003 | Ushiro |
| 2003/0027619 A1 | 2/2003 | Nicastro |
| 2003/0032476 A1 | 2/2003 | Walker |
| 2003/0102625 A1 | 6/2003 | Katz |
| 2003/0109301 A1 | 6/2003 | Chudley |
| 2003/0157978 A1 | 8/2003 | Englman |
| 2003/0174178 A1 | 9/2003 | Hodges |
| 2003/0190960 A1 | 10/2003 | Jokipii |
| 2003/0216167 A1 | 11/2003 | Gauselmann |
| 2004/0002387 A1 | 1/2004 | Grady |
| 2004/0068451 A1 | 4/2004 | Lenk |
| 2004/0185932 A1 | 9/2004 | Lombardo |
| 2004/0215524 A1 | 10/2004 | Parkyn |
| 2004/0219969 A1 | 11/2004 | Casey |
| 2004/0224745 A1 | 11/2004 | Bregenzer |
| 2004/0225387 A1 | 11/2004 | Smith |
| 2004/0267611 A1 | 12/2004 | Hoerenz |
| 2005/0096117 A1 | 5/2005 | Katz |
| 2005/0114223 A1 | 5/2005 | Schneider |
| 2005/0165686 A1 | 7/2005 | Zack |
| 2005/0192087 A1 | 9/2005 | Friedman |
| 2005/0209008 A1 | 9/2005 | Shimizu |
| 2005/0227751 A1 | 10/2005 | Zanelli |
| 2005/0255914 A1 | 11/2005 | McHale |
| 2005/0277474 A1 | 12/2005 | Barry |
| 2006/0030407 A1 | 2/2006 | Thayer |
| 2006/0063587 A1 | 3/2006 | Manzo |
| 2006/0116196 A1 | 6/2006 | Vancura |
| 2006/0155597 A1 | 7/2006 | Gleason |
| 2006/0200370 A1 | 9/2006 | Ratliff |
| 2006/0217198 A1 | 9/2006 | Johnson |
| 2006/0287029 A1 | 12/2006 | Yoshinobu |
| 2006/0287102 A1 | 12/2006 | White |
| 2007/0021213 A1 | 1/2007 | Foe |
| 2007/0060314 A1 | 3/2007 | Baerlocher |
| 2007/0077988 A1 | 4/2007 | Friedman |
| 2007/0111770 A1 | 5/2007 | Van Luchene |
| 2007/0129139 A1 | 6/2007 | Nguyen |
| 2007/0129147 A1 | 6/2007 | Gagner |
| 2007/0191101 A1 | 8/2007 | Coliz |
| 2007/0191102 A1 | 8/2007 | Coliz |
| 2007/0213116 A1 | 9/2007 | Crawford |
| 2007/0281285 A1 | 12/2007 | Jayaweera |
| 2007/0287523 A1 | 12/2007 | Esses |
| 2008/0009344 A1 | 1/2008 | Graham |
| 2008/0032787 A1 | 2/2008 | Low |

(56) References Cited

U.S. PATENT DOCUMENTS

| | | |
|---|---|---|
| 2008/0058092 A1 | 3/2008 | Schwartz |
| 2008/0113706 A1 | 5/2008 | OHalloran |
| 2008/0113815 A1 | 5/2008 | Weingardt |
| 2008/0124353 A1 | 5/2008 | Brodeur |
| 2008/0154798 A1 | 6/2008 | Valz |
| 2008/0171599 A1 | 7/2008 | Salo |
| 2008/0176625 A1 | 7/2008 | Kelly |
| 2008/0194318 A1 | 8/2008 | Kralicky |
| 2008/0200260 A1 | 8/2008 | Deng |
| 2008/0207306 A1 | 8/2008 | Higbie |
| 2008/0214295 A1 | 9/2008 | Dabrowski |
| 2008/0227525 A1 | 9/2008 | Kelly |
| 2008/0234043 A1 | 9/2008 | McCaskey |
| 2008/0248867 A1 | 10/2008 | Englman |
| 2008/0275786 A1 | 11/2008 | Gluck |
| 2008/0300045 A1 | 12/2008 | Ratcliff |
| 2008/0318668 A1 | 12/2008 | Ching |
| 2009/0011812 A1 | 1/2009 | Katz |
| 2009/0017886 A1 | 1/2009 | McGucken |
| 2009/0036199 A1 | 2/2009 | Myus |
| 2009/0048918 A1 | 2/2009 | Dawson |
| 2009/0061982 A1 | 3/2009 | Brito |
| 2009/0124353 A1 | 5/2009 | Collette |
| 2009/0204907 A1 | 8/2009 | Finn |
| 2009/0210301 A1 | 8/2009 | Porter |
| 2009/0234710 A1 | 9/2009 | Belgaied Hassine |
| 2009/0315893 A1 | 12/2009 | Smith |
| 2010/0004048 A1 | 1/2010 | Brito |
| 2010/0022307 A1 | 1/2010 | Steuer |
| 2010/0035689 A1 | 2/2010 | Altshuler |
| 2010/0041472 A1 | 2/2010 | Gagner |
| 2010/0041481 A1 | 2/2010 | Smedley |
| 2010/0050088 A1 | 2/2010 | Neustaedter |
| 2010/0070056 A1 | 3/2010 | Coronel |
| 2010/0094841 A1 | 4/2010 | Bardwil |
| 2010/0099471 A1 | 4/2010 | Feeney |
| 2010/0107214 A1 | 4/2010 | Ganz |
| 2010/0113162 A1 | 5/2010 | Vemuri |
| 2010/0174593 A1 | 7/2010 | Cao |
| 2010/0198653 A1 | 8/2010 | Bromenshenkel |
| 2010/0210356 A1 | 8/2010 | Losica |
| 2010/0227675 A1 | 9/2010 | Luxton |
| 2010/0227682 A1 | 9/2010 | Reville |
| 2010/0228606 A1 | 9/2010 | Walker |
| 2010/0240444 A1 | 9/2010 | Friedman |
| 2010/0241491 A1 | 9/2010 | Eglen |
| 2010/0241492 A1 | 9/2010 | Eglen |
| 2010/0306015 A1 | 12/2010 | Kingston |
| 2011/0065511 A1 | 3/2011 | Mahan |
| 2011/0092271 A1 | 4/2011 | Nguyen |
| 2011/0092273 A1 | 4/2011 | Cerbini |
| 2011/0111841 A1 | 5/2011 | Tessmer |
| 2011/0112662 A1 | 5/2011 | Thompson |
| 2011/0113353 A1 | 5/2011 | Koh |
| 2011/0118002 A1 | 5/2011 | Aoki |
| 2011/0145040 A1 | 6/2011 | Zahn |
| 2011/0151957 A1 | 6/2011 | Falciglia |
| 2011/0218033 A1 | 9/2011 | Englman |
| 2011/0227919 A1 | 9/2011 | Bongio |
| 2011/0256921 A1 | 10/2011 | Pacey |
| 2011/0256936 A1 | 10/2011 | Walker |
| 2011/0263324 A1 | 10/2011 | Ganetakos |
| 2011/0275438 A9 | 11/2011 | Hardy |
| 2011/0281638 A1 | 11/2011 | Bansi |
| 2011/0281654 A1 | 11/2011 | Kelly |
| 2011/0282764 A1 | 11/2011 | Borst |
| 2011/0300923 A1 | 12/2011 | VanLuchene |
| 2011/0319152 A1 | 12/2011 | Ross |
| 2011/0319170 A1 | 12/2011 | Shimura |
| 2012/0011002 A1 | 1/2012 | Crowe |
| 2012/0015714 A1 | 1/2012 | Ocko |
| 2012/0015715 A1 | 1/2012 | Luxton |
| 2012/0034961 A1 | 2/2012 | Berman |
| 2012/0034973 A1 | 2/2012 | Frank |
| 2012/0040743 A1 | 2/2012 | Auterio |
| 2012/0040761 A1 | 2/2012 | Auterio |
| 2012/0042282 A1 | 2/2012 | Wong |
| 2012/0047002 A1 | 2/2012 | Patel |
| 2012/0059730 A1 | 3/2012 | Jensen |
| 2012/0083909 A1 | 4/2012 | Carpenter |
| 2012/0094743 A1 | 4/2012 | Odom |
| 2012/0101886 A1 | 4/2012 | Subramanian |
| 2012/0108306 A1 | 5/2012 | Munsell |
| 2012/0109785 A1 | 5/2012 | Karlsson |
| 2012/0115593 A1 | 5/2012 | Vann |
| 2012/0122589 A1 | 5/2012 | Kelly |
| 2012/0129590 A1 | 5/2012 | Morrisroe |
| 2012/0130856 A1 | 5/2012 | Petri |
| 2012/0142429 A1 | 6/2012 | Muller |
| 2012/0156668 A1 | 6/2012 | Zelin |
| 2012/0157187 A1 | 6/2012 | Moshal |
| 2012/0157193 A1 | 6/2012 | Arezina |
| 2012/0166380 A1 | 6/2012 | Sridharan |
| 2012/0166449 A1 | 6/2012 | Pitaliya |
| 2012/0178514 A1 | 7/2012 | Schulzke |
| 2012/0178515 A1 | 7/2012 | Adams |
| 2012/0178529 A1 | 7/2012 | Collard |
| 2012/0197874 A1 | 8/2012 | Zatkin |
| 2012/0202570 A1 | 8/2012 | Schwartz |
| 2012/0203669 A1 | 8/2012 | Borsch |
| 2012/0215667 A1 | 8/2012 | Ganz |
| 2012/0221430 A1 | 8/2012 | Naghmouchi |
| 2012/0226573 A1 | 9/2012 | Zakas |
| 2012/0231891 A1 | 9/2012 | Watkins |
| 2012/0244945 A1 | 9/2012 | Kolo |
| 2012/0244947 A1 | 9/2012 | Ehrlich |
| 2012/0244950 A1 | 9/2012 | Braun |
| 2012/0245988 A1 | 9/2012 | Pace |
| 2012/0256377 A1 | 10/2012 | Schneider |
| 2012/0282986 A1 | 11/2012 | Castro |
| 2012/0289315 A1 | 11/2012 | Van Luchene |
| 2012/0289330 A1 | 11/2012 | Leydon |
| 2012/0289346 A1 | 11/2012 | VanLuchene |
| 2012/0295699 A1 | 11/2012 | Reiche |
| 2012/0296716 A1 | 11/2012 | Barbeau |
| 2012/0302329 A1 | 11/2012 | Katz |
| 2012/0309504 A1 | 12/2012 | Isozaki |
| 2012/0311504 A1 | 12/2012 | van Os |
| 2012/0322545 A1 | 12/2012 | Arnone |
| 2012/0322561 A1 | 12/2012 | Kohlhoff |
| 2012/0330785 A1 | 12/2012 | Hamick |
| 2013/0005437 A1 | 1/2013 | Bethke |
| 2013/0005438 A1 | 1/2013 | Ocko |
| 2013/0005466 A1 | 1/2013 | Mahajan |
| 2013/0005473 A1 | 1/2013 | Bethke |
| 2013/0005475 A1 | 1/2013 | Mahajan |
| 2013/0005480 A1 | 1/2013 | Bethke |
| 2013/0006735 A1 | 1/2013 | Koenigsberg |
| 2013/0006736 A1 | 1/2013 | Bethke |
| 2013/0012304 A1 | 1/2013 | Cartwright |
| 2013/0013094 A1 | 1/2013 | Parks |
| 2013/0013326 A1 | 1/2013 | Miller |
| 2013/0013404 A1 | 1/2013 | Suprock |
| 2013/0013459 A1 | 1/2013 | Kerr |
| 2013/0029745 A1 | 1/2013 | Kelly |
| 2013/0072278 A1 | 3/2013 | Salazar |
| 2013/0079087 A1 | 3/2013 | Brosnan |
| 2013/0090173 A1 | 4/2013 | Kislyi |
| 2013/0090750 A1 | 4/2013 | Herrman |
| 2013/0095914 A1 | 4/2013 | Allen |
| 2013/0123005 A1 | 5/2013 | Allen |
| 2013/0124361 A1 | 5/2013 | Bryson |
| 2013/0151342 A1 | 6/2013 | Citron |
| 2013/0173393 A1 | 7/2013 | Calman |
| 2013/0178259 A1 | 7/2013 | Strause |
| 2013/0210511 A1 | 8/2013 | LaRocca |
| 2013/0217489 A1 | 8/2013 | Bronstein Bendayan |
| 2013/0226733 A1 | 8/2013 | Evans |
| 2013/0237299 A1 | 9/2013 | Bancel |
| 2013/0244767 A1 | 9/2013 | Barclay |
| 2013/0288757 A1 | 10/2013 | Guthridge |
| 2013/0290147 A1 | 10/2013 | Chandra |
| 2013/0303276 A1 | 11/2013 | Weston |
| 2013/0310164 A1 | 11/2013 | Walker |

(56) References Cited

U.S. PATENT DOCUMENTS

| | | |
|---|---|---|
| 2013/0344932 A1 | 12/2013 | Adams |
| 2014/0004884 A1 | 1/2014 | Chang |
| 2014/0018156 A1 | 1/2014 | Rizzotti |
| 2014/0033262 A1 | 1/2014 | Anders |
| 2014/0038679 A1 | 2/2014 | Snow |
| 2014/0067526 A1 | 3/2014 | Raju |
| 2014/0067544 A1 | 3/2014 | Klish |
| 2014/0073436 A1 | 3/2014 | Takagi |
| 2014/0087864 A1 | 3/2014 | Togashi |
| 2014/0089048 A1 | 3/2014 | Bruich |
| 2014/0100020 A1 | 4/2014 | Carroll |
| 2014/0106858 A1 | 4/2014 | Constable |
| 2014/0128137 A1 | 5/2014 | Balise |
| 2014/0157314 A1 | 6/2014 | Roberts |
| 2014/0206452 A1 | 7/2014 | Bambino |
| 2014/0243072 A1 | 8/2014 | Santini |
| 2014/0274359 A1 | 9/2014 | Helava |
| 2014/0295958 A1 | 10/2014 | Shono |
| 2014/0315616 A1 | 10/2014 | Avin |
| 2014/0329585 A1 | 11/2014 | Santini |
| 2014/0337259 A1 | 11/2014 | Lamb |
| 2015/0011286 A1 | 1/2015 | Kim |
| 2015/0019349 A1 | 1/2015 | Milley |
| 2015/0031440 A1 | 1/2015 | Desanti |
| 2015/0087378 A1 | 3/2015 | Louie |
| 2015/0306494 A1 | 10/2015 | Pieron |
| 2015/0335995 A1 | 11/2015 | McLellan |
| 2015/0352436 A1 | 12/2015 | Pieron |

FOREIGN PATENT DOCUMENTS

| | | |
|---|---|---|
| WO | 2013013281 | 1/2013 |
| WO | 2013059639 | 1/2013 |
| WO | 2013116904 | 1/2013 |
| WO | 2015013373 | 1/2015 |
| WO | 2015168187 | 11/2015 |
| WO | 2015179450 | 11/2015 |
| WO | 2015196105 | 12/2015 |

OTHER PUBLICATIONS

Profession—WoWWiki—Your guide to the World of Warcraft, URL: http://www.wowwiki.com/Profession, printed Nov. 6, 2012, 8 pages.
"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.
"Behavioural Analytics & Campaigning", http://lotaris.com/behavioural._analytics_and._Campaigning.htm, screenshot access date May 24, 2012 2:21 PM, 1 page.
"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do->, Apr. 23, 2014, 9 pages.
"Clash of Clans". Wikipedia.org. Online. Accessed via the Internet. Accessed Aug. 9, 2014. <URL: http://en.wikipedia.org/wiki/Clash of Clans>, 3 pages.
"Lotro-Wiki.com" (evidence in regards to "Lord of the Rings Oline" MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550, http://lotro-wiki.com/index.php?title=Quest:A_Little_Extra_Never_Hurts_--_Part_1&oldid=399597, http://lotro-wiki.com/index.php?title=Quest:A_Little_Extra_Never_Hurts_--_Part_2&oldid=399366, http://lotro-wiki.com/index.php?title=Getting_Started&oldid=349681, Links are to used articles, 33 pages.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.
"Building Structures". War2.warcraft.org. Online. Accessed via the Internet. Accessed Aug. 9, 2014. <URL: http://war2.warcraft.org/strategy/verybasics/building.shtml>, 3 pages.
City Coins. CityVille Wikia. Online. Accessed via the Internet. Accessed Aug. 9, 2014. <URL: http://cityville.wikia.com/wiki/City_Coins>, 2 pages.
Gaia "Black Friday Bundle" available on Nov. 23, 2011, from http://www.gaiaonline.com/forum/community-announcements/black-friday-big-bundles-rare-items/t.76127933/, 5 pages.
UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.
Wiki "Gaia online"', available on Sep. 9, 2011, https://web.archive.org/web/20110927210155/http://en.wikipedia.org/wiki/Gaia_Online, 8 pages.
FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.
TFWiki "teamfortress wiki" available Nov. 5, 2011 retrieved from https://web.archive.org/web/20111105044256/http://wiki.teamfortress.com/wiki/Loadout, 4 pages.
MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.
Super Mario Bros. 3 Review, Nintendo for NES, Feb. 1990, pp. 1-4.
Super Mario Bros. 3, NES Gameplay, http://www.youtube.com/watch?v=82TL-Acm4ts, Published on Mar. 14, 2009, 1 page.
"Kabam Community Forums > Kingdoms of Camelot > Kingdoms of Camelot Open Discussion > Open Discussion : Tournament of Might Prizes / Main Discussion thread", printed from http://community.kabam.com/forums/archive/index.php/t-43273.html, Oct. 24, 2011, 23 pages.
"Rest—WoWWiki—Your guide to the World of Warcraft", printed from http://www.wowwiki.com/Rest, May 19, 2014, 2 pages.
'Quest item—WoWWiki—Your guide to the World of Warcraft', printed from http://www.wowwiki.com/Quest_Item, Retrieved on Apr. 16, 2014, 1 page.
"Cataclysm Guide: Guild Advancement—Wowhead", http://www.wowhead.com/guide=cataclysm&guilds, printed Dec. 5, 2013, 4 pages.
TFF Challenge—UC Davis, http://tffchallenge.com/team/uc-davis/, printed Jan. 15, 2014, 12 pages.
"Guild Housing System—FlyFF Wiki", http://flyff-wiki.gpotato.com/wiki/Guild_Housing_System, printed Dec. 5, 2013, 5 pages.
Elsword, Dec. 27, 2007, KOG Studios, Guide posted Mar. 17, 2011, http://forums.elswordonline.com/topic5673.aspx,http://en.wikipedia.org/wiki/Elsword, 16 pages.
Diablo 2, Blizzard Entertainment, Mar. 23, 2009, manual and online website, http://web.archive.Org/web/20090323171356/http://classic.battle.net/diablo 2exp/items/basics.shtml, 51 pages.
Path of Exile, Internet posting: http://web.archive.org/web/20120606004658/http://www.pathofexile.com/forum/view-thread/12056, Nov. 16, 2011, 52 pages.
MapleStory—Guides—Equipment Upgrading 101: Scrolls, URL: maplestory.nexon.net/guides/game-play/systems/OOFFV/#mitigating [Retrieved Jun. 24, 2013], 4 pages.
MapleStory—Guides—Equipment Upgrading 101: Potentials, URL: maplestory.nexon.net/guides/game-play/systems/OOFlj/ [Retrieved Jun. 24, 2013], 5 pages.
Dreamslayer's Enchanting and Upgrading Guide—With Pictures:D and Explanations, URL: forums.elswordonline.com/Topic5673.aspx [Retrieved Feb. 21, 2013], 8 pages.
The Arreat Summit—Items: Basic Item Information, URL: web.archive.org/web/20090323171356/http://classic.battle.net/diablo2exp/items/basics.shtml [Retrieved Feb. 21, 2013], 3 pages.
Elsword—Wikipedia, the free encyclopedia, URL: en.wikipedia.org/wiki/Elsword [Retrieved Feb. 21, 2013], 6 pages.

(56) References Cited

OTHER PUBLICATIONS

Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.
Super Mario Bros. 3, StrategyWiki, the video game walkthrough and strategy guide, http://strategywiki.org/wiki/Super_Mario_Bros._3, Oct. 2, 2012, 4 pages.
MapleStory, Internet guide: http://maplestory.nexon.net/guides/game-play/systems/00Flk/, http://maplestory.nexon.net/guides/game-play/systems/00Flk, http://maplestory.nexon.net/guides/game-play/systems/00FFV, Sep. 28, 2012, 12 pages.
"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.
"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.
Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1--14-29-Hamari,Lehdonvirta.pdf, on May 26, 2015, 16 pages.
"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne . . . , posted Tuesday, Mar. 27, 2012, screenshop access date May 24, 2012, 2:19 PM, 1 page.
MapleStory—Guides—Equipment Upgrading 101: Enhancements, URL: maplestory.nexon.net/guides/game-play/systems/OOFlk; [Retrieved Jun. 24, 2013] 3 pages.
Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.
Ozeagle, "What happens if . . . answers about account types" on Lotro forum, Jan. 18, 2011,<https://www.lotro.com/forums/showthread.php?377885-What-happens-if-answers-about-the-account-types> (16 pgs).
<http://lotro-wiki.com/index.php?title=Ouest:A_Little_Extra_Never_Hurts_--_Part_2&oldid=399366>, <http://lotrowiki.com/index.php?title=Getting_Started&oldid=349681 >. Links are to used articles. (7 pgs) Feb. 26, 2014.
"Lotro-Wiki.com" (evidence in regards to "Lord of the Rings Oline" MMORPG game), latest Dec. 22, 2011, <http://lotrowiki.com/index.php/Main_Page), http://lotro-wiki.com/index.php?title=LOTRO_Store&oldid=396550, http://lotro-wiki.com/index.php?title=Quest:A_Little_Extra_Never_Hurts_--_Part_1&oldid=399597, http://lotro-wiki.com/index.php?title=Quest:A_Little_Extra_Never_Hurts_--_Part_2&oldid=399366, http://lotro-wiki.com/index.php?title=Getting_Started&oldid=349681, Links are to used articles, 33 pages.
"Treasure Chest Game" written by Zelda Wiki, the Zelda encyclopedia; published on or before Oct. 17, 2012; accessible andprinted from URL <http://web.archive.org/web/20121017085058/http://zeldawiki.org/Treasure_Chest_Game>, 4 pages.
"Quest: A Little Extra Never Hurts—Part 1" written by Zimoon, published on Dec. 22, 2011 and printed from URL <http://lotro-wiki.com/index.php?title=Quest:A_Little_Extra_Never_Hurts_--_Part_1&oldid=399597>, 3 pages.
"Quest: A Little Extra Never Hurts—Part 2" written by Zimoon, published on Dec. 21, 2011 and printed from URL <http://lotro-wiki.com/index.php?title=Quest:A_Little_Extra_Never_Hurts_--_Part_2&oldid=399366>, 2 pages.
"Getting Started" written by BoD, published on Oct. 13, 2011 and printed from URL <http://lotrowiki.com/index.php?title=Getting_Started&oldid=349681 >, 5 pages.
"Lotro Store" written by Elinnea, published on Dec. 15, 2011 and printed from URL <http://lotrowiki.com/index.php ?title=LOTRO _Store&oldid=396550>, 23 pages.
"Main Page" written by Starbusty, published on Dec. 12, 2011 and printed from URL <http://lotrowiki.com/index.php?title=Main_Page&oldid=394429>, 2 pages.
New Feature: Tiered Tournaments and Tournament Updates, printed from http://community.kabam.com/forums/showthread.php?171349-New-Feat on Feb. 11, 2014, 2 pages.
Wikipedia, Mafia Wars, <http://en.wikipedia.org/wiki/Mafia_Wars>, Jan. 28, 2012, 3 pages.
Elsword, Dec. 27, 2007, KOG Studios, guide posted Mar. 17, 2011 https://web.arch ive.org/web/20110509033123/http ://forums. elswordon l ine.com/Topic5673.aspx, http://en.wikipedia.org/wiki/Elsword (9 pages).
Diablo 2, Blizzard Entertainment, Mar. 23, 2009, manual and on line website http://web.archive.org/web/20090323171356/http://classic.battle.net/diablo2exp/items/basics.shtml (4 pages).

PROVIDING LEADERBOARD BASED UPON IN-GAME EVENTS

FIELD OF THE DISCLOSURE

This disclosure relates to providing leaderboards in online games, in particular providing leaderboards based upon in-game events within a game space.

BACKGROUND

Leaderboards for games are known. Previously, leaderboards have been used to represent the high score of all users playing a game. The games usually have a single leaderboard viewable by every player within the game, such that only the players with the highest scores feature on the leaderboard for the game.

Such leaderboards offer limited incentive to new players who will have to put in many tens, or even hundreds, of hours of game play before having a chance to appear on the game's leaderboard. Similarly, leaderboards specific to parts of the game are unavailable to display a user's relative hierarchy, or ranking, compared to a subset of players within the game. The leaderboards often feature highest scores from all players within the game, missing the opportunity of incentivizing the user by displaying to the user a leaderboard featuring a subset of users.

SUMMARY

One aspect of the disclosure relates to providing users with leaderboards based upon in-game events within a game space. A game may have many leaderboards associated with different elements within the game. For example, the game may have one or more administrator defined objectives. Individual ones of the one or more objectives may have associated activities which are required to be completed to achieve the objective. There may be provided a leaderboard for each objective and/or each associated activity displaying the hierarchy of each user with respect to other users in accomplishing the objective and/or completing the activities. Providing leaderboards for each objective and/or activity incentivizes users to keep working toward the particular objective, improving player retention. By providing leaderboards for sub-elements of the game, instead of only providing a single high-score leaderboard, creates increased opportunity for a user to feature on a leaderboard early in the game, increasing the incentive to the user to play, and improving user retention and monetization.

The leaderboards may feature a subset of users from the pool of all users playing the game or working toward achieving the objective. The subset of users may be affiliated or associated with the user to which the leaderboard is presented. The subset of users may be selected based on an indication of one or more user parameters. Such user parameters may include an indication that users commonly interact within the game space, electronic social media associations, geographical location of the users, groups, guilds or alliances that the user belongs to, an indication of the user's real-world affiliations, and/or other user parameters indicating the user has a connection or a similarity with one or more other users.

Providing leaderboards featuring a subset of users having a common attribute and/or affiliation, increases competitiveness in the users, providing an incentive to continue playing, improving user retention and monetization.

The system may include one or more servers. The server(s) may be configured to communicate with one or more client computing platforms according to a client/server architecture. The users may access the system via the client computing platforms. Client computing platforms may include, but not be limited to, personal computers, laptops, and/or handheld devices such as smartphones, tablets, and PDAs. The server(s) may be configured to communicate with the one or more client computing platforms through a network, such as the Internet. Web servers may be utilized to facilitate communication between the server(s) and the client computing platforms, where web servers host one or more websites associated with the online game.

The server(s) may be configured to execute one or more computer program modules to facilitate providing leaderboards to users based on in-game events. The computer program modules may include one or more of a game module, an objective module, an activity monitoring module, an objective monitoring module, a progress presentation module, a motivation module and/or other modules. In some implementations, the client computing platforms may be configured to execute one or more computer program modules that are the same as or similar to the computer program modules of the server(s) to facilitate providing leaderboards to users based on in-game events.

The game module may be configured to execute an instance of an online game. The game module may be further configured to implement the instance of the online game to facilitate interaction of the users with the game. The game module may be configured to execute an instance of a virtual environment, in which the online game may be implemented. The game module may be configured to facilitate presentation of the virtual environment to the user. The game module may also be configured to facilitate interaction of the users with the online game by executing actions in the instance of the online game in response to receiving action requests from the users. In other implementations, the game module may be configured to execute an instance of a two-dimensional online game, whereby users interact with the two-dimensional game through the client computing platforms.

The objective module may be configured to obtain an objective definition of an administrator specified objective to be achieved by users of the game as part of a limited time event. The users' progress toward achieving the objective may be automatically presented to the users individually in a user-specific leaderboard, as discussed below. The objective may require one or more activities in the game associated with the objective to be completed by users. The user's progress toward completing the activities may be automatically presented to users individually in a user-specific leaderboard, as discussed below.

The objective may be a time-limited event within the main game of the online game. Examples of administrator-defined objectives may include at least one of exploring a map, researching a technology or skill, purchasing an in-game item, harvesting a specified type of resource, defeating one or more other players in player-versus-player combat, defeating non-player characters, participating and completing player-versus-environment activities, completing quests, and/or completing an in-game achievement. Other administrator-defined objectives may include occupying a particular area of a virtual environment, cultivate a defined amount and/or variety of a particular product or resource, build a game item, such as a city or building, form an alliance with other users, progress to another level within the game, and/or any other objective which may be defined by an administrator.

The activity monitoring module may be configured to determine one or more activity metrics for the users in response to the objective being obtained. The activity metrics may be based upon the users' progress toward completing the activities defined in the objective definition. The activity monitoring module may be configured to determine a first activity metric value for a first user based upon the first user's progress toward completing a first activity. An objective may have one or more associated activities, whereby the activities are required to be completed before the objective can be accomplished.

The associated activities may be defined by an administrator, or one or more computer program modules may be able to determine the associated activities from the definition of the objective defined by an administrator. As a non-limiting example, the objective may be to complete a quest within the game. To complete the quest the player may be required to obtain an object B to defeat a non-player character C. The definition of the administrator-defined objective may include the requirements to complete a first activity, related to obtaining the object B, and a second activity, related to defeating the non-player character C. In other implementations, the one or more computer programs may be configured to determine, upon an administrator defining an objective as requiring users to complete a quest, that users must obtain an object B in order to defeat non-player character C. The activity monitoring module may be configured to determine a first activity metric value indicating the user's progress toward obtaining object B, and a second activity metric value indicating the user's progress toward defeating non-player character C, in response to the objective being defined.

Some activities required to be completed to achieve an objective require the user to undertake one or more actions. Such that, individual ones of the one or more activities require users to complete multiple actions defined in the objective definition, such that a third activity requires users to complete a first action and a second action. For example, to obtain an object B, necessary in order to complete a quest, the user may be required to perform actions D and E. The performance of actions D and E may be defined by an administrator as being required in order for a user to obtain object B. In alternative implementations, the one or more computer program modules may be configured to determine that obtaining object B requires the performance of actions D and E.

The activity monitoring module may be configured to determine a first action metric value and a second action metric value for the first user indicating the first user's progress toward completing the first action and the second action. For example, the first action metric value may be associated with a progress toward performance of action D, and the second action metric value may be associated with a progress toward performance of action E. The activity monitoring module may be configured to determine the third activity metric value indicating the first user's progress toward completing the third activity, based on the first action metric value and the second action metric value. The activity monitoring module may be configured to account for a difference in respective contributions, toward the user's progress toward completing the third activity, from the first action metric value and the second action metric value when determining the third activity metric value.

The objective monitoring module may be configured to determine an objective metric for the users indicating the users' progress toward achieving the objective. The users' progress toward achieving the objective may be based upon the one or more activity metrics for the user. The objective monitoring module may be configured to determine a first objective metric value for the first user based upon the first activity metric value for the first user. The objective monitoring module may be configured to determine a first objective metric value for the first user based on a second activity metric for the first user, such that the first activity metric and the second activity metric may indicate the first user's progress of two otherwise distinct activities, in furtherance of achieving the defined objective.

Different activities, required to be completed to achieve the objective, may have different associated complexities and/or time requirements, providing activities having irregularly weighted contributions toward achieving the objectives. The objective monitoring module may be configured to determine objective metrics for the users in a game space, based on the weighted activity metrics for the users, such that a first user having completed a first activity may have a higher objective metric value than a second user who has completed a second activity and a third activity.

The objective monitoring module may be configured to determine a second objective metric value for a second user. The second objective metric value may be based upon one or more activity metric values for the second user. The objective monitoring module may be configured to determine a hierarchy for the first objective metric value for the first user and the second objective metric value for the second user. The hierarchy of the first objective metric value of the first user and the second objective metric value for the second user providing an indication of which user has progressed further toward achieving the objective. The user with the greater progress toward achieving the objective appearing higher in the hierarchy than a user with less progress toward achieving the objective. The objective monitoring module may be configured to determine the objective metric values for any number of users, and determine a hierarchy for the any number of users.

The objective monitoring module may be configured to determine the objective metrics for many users where the users may be required to perform different activities in order to achieve an objective. For example, a first user may be required to complete a first activity and a second activity to achieve an objective, as defined by an administrator. A second user may be required to complete a third activity to achieve the objective. Differences in requirements for the users to achieve the objective may be based on one or more user parameters indicating differences in the users.

The progress presentation module may be configured to effectuate presentation of the objective metric values determined for the users according to a hierarchy of the objective metric values for the users, in response to obtaining the administrator-defined objective. Such presentation may be in the form of a leaderboard presented to the users individually as a user-specific leaderboard. Such presentation may be in response to obtaining the administrator-defined objective, or in response to an indication that the user has started to work toward achieving the administrator-defined objective. The progress presentation module may be configured to effectuate presentation of the first objective metric value determined for the first user, to the first user. Similarly, the progress presentation module may be configured to effectuate presentation of a second objective metric value determined for a second user, to the second user.

The progress presentation module may be configured to effectuate presentation of the first objective metric value determined for the first user and the second objective metric value determined for the second user according to the determined hierarchy of the first objective metric value and the second objective metric value. The progress presentation module may be configured to effectuate presentation of the objective metric values, to the users, according to a hierarchy, as determined by the objective monitoring module, together with the objective metric values of one or more other users in the game. The one or more other users, compared in the hierarchy, may be all other users participating in pursuing the objective, a selection of users affiliated with the first user, for example users having an indication that they interact with the first user using electronic social media, users which have formed an alliance or guild within the game space, users having similar demographics, such as geography or affiliations with real-world organizations such as universities or businesses, and/or any other combination of users having one or more like parameters or characteristics.

The progress presentation module may be configured to effectuate presentation of the first activity metric value determined for the users according to a hierarchy of the first activity metric values determined for the users. Each activity required to be completed to achieve the objective may have an associated leaderboard. Similarly, each action required to be taken to complete an activity may have an associated leaderboard. Each leaderboard may compare the user's objective, activity or action metric value with the metric values of one or more other users.

The motivational module may be configured to effectuate presentation to the first user of a motivational message, wherein the motivational message comprises an indication of the hierarchy of the objective metric value for the first user. The motivational message may provide an indication that the user is near to achieving the objective, has a relatively high objective metric value compared to other users, and/or provide some other indication of the user's progress toward achieving the objective. The motivational module may be further configured to effectuate presentation to the first user of one or more incentives for achieving a relatively high objective metric value in the hierarchy of objective metric values. The motivational module may be configured to effectuate presentation to the first user of one or more incentives for achieving the objective defined by an administrator.

Incentives may be available to the users at various stages of accomplishing the objective. Incentives may be available for reaching the top of the objective leaderboard, being an indication of which user is closest to achieving the objective. Similarly, incentives may be available for reaching the top of each of the activity leaderboards or action leaderboards. Incentives may be available for achieving the objective in the shortest period of time, for reaching the top of a leaderboard in the shortest period of time, for achieving the objective or completing an activity with the fewest actions, or for any other measurable stage in a user's progress toward achieving the objective.

Such incentives may include one or more of virtual items, other amounts of virtual currency, access to areas in the game space that were previously not accessible to the first user, quests in the game space that were previously not available to the first user and/or other incentives to incentivize the first user to keep striving to achieve the objective, complete the activity or perform the action.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
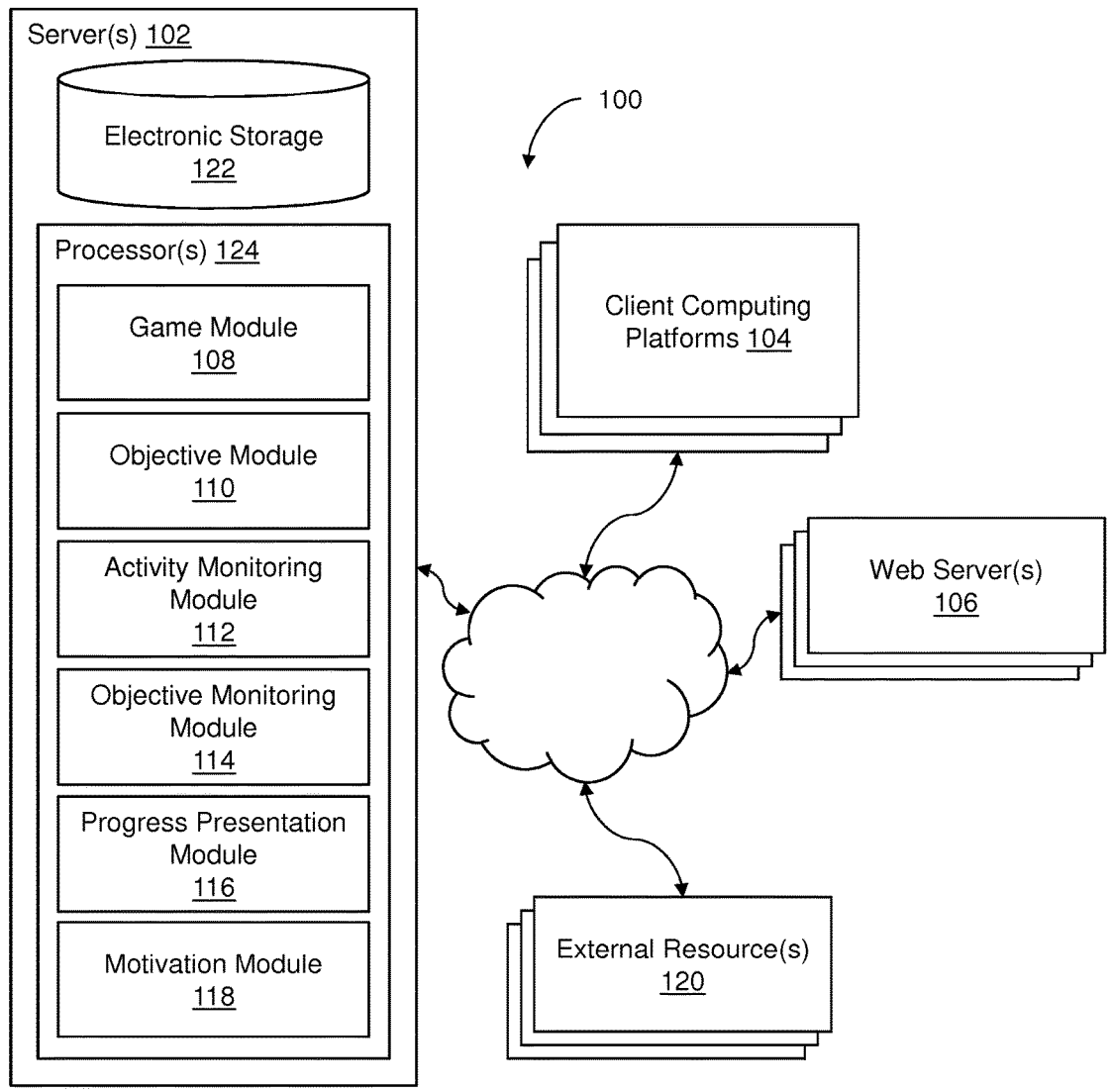
FIG. 1 illustrates a system configured to facilitate providing leaderboards to users based on in-game events, in accordance with one or more implementations.

FIG. 1 illustrates a system 100 configured to facilitate providing leaderboards to users based on in-game events, in accordance with one or more implementations. A game may have many leaderboards associated with different elements within the game. For example, the game may have one or more administrator defined objectives. At least one of the one or more objectives may have associated activities which are required to be completed to achieve the objective. There may be provided a leaderboard for each objective and/or each associated activity displaying the hierarchy of each user with respect to other users in accomplishing the objective and/or completing the activities. Providing leaderboards for each objective and/or activity incentivizes users to keep working toward the particular objective, improving player retention. By providing leaderboards for sub-elements of the game, instead of only providing a single high-score leaderboard, creates increased opportunity for a user to feature on a leaderboard early in the game, increasing the incentive to the user to play, and improving user retention.

The leaderboards may feature a subset of users from the pool of all users playing the game or working toward achieving the objective. The subset of users may be affiliated or associated with the user to which the leaderboard is presented. The subset of users may be selected based on an indication of one or more user parameters. Such user parameters may include an indication of users commonly interacted within the game space, electronic social media locations of the user, groups or guilds that the user belongs to, geographic location of the user, an indication of the user's real-world affiliations, and/or other user parameters indicating the user has a connection with one or more other users. Providing leaderboards featuring a subset of users having a common attribute and/or affiliation increases competitiveness in the users, providing an incentive to continue playing, improving user retention.

The system 100 may include one or more servers 102. The server(s) 102 may be configured to communicate with one or more client computing platforms 104 according to a client/server architecture. The users may access the system 100 via the client computing platforms 104. Client computing platforms 104 may include, but not be limited to, personal computers, laptops, and/or handheld devices such as smartphones, tablets, and PDAs. The server(s) 102 may be configured to communicate with the one or more client computing platforms 104 through a network, such as the Internet. Web servers 106 may be utilized to facilitate communication between the server(s) 102 and the client computing platforms 104, where web servers 106 may host one or more websites associated with the online game. The server(s) 102 may communicate with the client computing platform(s) 104 and/or web server(s) 106 through a network, such as the Internet. In some implementations, the server(s) 102 may include the web server(s) 106.

The server(s) 100 may be configured to execute one or more computer program modules to facilitate providing leaderboards to users based on in-game events. The computer program modules may include one or more of a game module 108, an objective module 110, an activity monitoring module 112, an objective monitoring module 114, a progress presentation module 116, a motivation module 118 and/or other modules. In some implementations, the client computing platforms 104 may be configured to execute one or more computer program modules that are the same as or similar to the computer program modules of the server(s) 102 to facilitate providing leaderboards to users based on in-game events.

A given client computing platform 104 may include one or more processors configured to execute computer program modules. The computer program modules may be configured to enable an expert or user associated with the given client computing platform 104 to interface with system 100, web servers 106, and/or external resources 120, and/or provide other functionality attributed herein to client computing platforms 104. By way of non-limiting example, the given client computing platform 106 may include one or more of a desktop computer, a laptop computer, a handheld computer, a tablet computing platform, a NetBook, a Smartphone, a gaming console, and/or other computing platforms.

The external resources 120 may include sources of information, hosts and/or providers of virtual environments outside of system 100, external entities participating with system 100, and/or other resources. In some implementations, some or all of the functionality attributed herein to external resources 100 may be provided by resources included in system 100.

The server(s) 102 may include electronic storage 122, one or more processors 124, and/or other components. The server(s) 102 may include communication lines, or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may comprise electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor 122, information received from server(s) 102, information received from client computing platforms 104, and/or other information that enables server(s) 102 to function as described herein.

Processor(s) 124 is configured to provide information processing capabilities in server(s) 102. As such, processor(s) 102 may include one or more of a digital processor, an analog processor, a digital circuit designed to process information, an analog circuit designed to process information, a state machine, and/or other mechanisms for electronically processing information. Although processor x is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute modules 108, 110, 112, 114, 116, 118 and/or other modules. Processor(s) 124 may be configured to execute modules 108, 110, 112, 114, 116, 118 and/or other modules by software; hardware; firmware; some combination of software, hardware, and/or firmware; and/or other mechanisms for configuring processing capabilities on processor(s) 124.

It should be appreciated that although modules 108, 110, 112, 114, 116, and 118 are illustrated in FIG. 1 as being co-located within a single processing unit, in implementations in which processor(s) 124 includes multiple processing units, one or more of modules 108, 110, 112, 114, 116, 118 and/or other modules may be located remotely from the other modules. The description of the functionality provided by the different modules 108, 110, 112, 114, 116, 118 and/or other modules described below is for illustrative purposes, and is not intended to be limiting, as any of modules 108, 110, 112, 114, 116, 118 and/or other modules may provide more or less functionality than is described. For example, one or more of modules 108, 110, 112, 114, 116, 118 and/or other modules may be eliminated, and some or all of its functionality may be provided by other ones of modules 108, 110, 112, 114, 116, 118 and/or other modules. As another example, processor 124 may be configured to execute one or more additional modules that may perform some or all of the functionality attributed below to one of modules 108, 110, 112, 114, 116, 118 and/or other modules.

The game module 108 may be configured to execute an instance of an online game. The game module 108 may be further configured to implement the instance of the online game to facilitate interaction of the users with the game. The game module 108 may be configured execute an instance of a virtual space, in which the online game is implemented. The game module 108 may be configured to facilitate presentation of the virtual space to the user. The game module 108 may also be configured to facilitate interaction of the users with the online game by executing actions in the instance of the online game in response to receiving action requests from the users. In other implementations, the game module 108 may be configured to execute an instance of a two-dimensional online game, whereby users interact with the two-dimensional game using the client computing platforms 104.

The game module 108 may be configured to provide one or more virtual environments to users via client computing platforms 104. As used herein, a "virtual environment" may include a virtual space, one or more interactive, electronic social media, and/or other virtual environments.

A virtual environment may comprise a simulated space that is accessible by users via clients (e.g., client computing platforms 104) that present the views of the virtual environment to a user. Web servers 106 may also be used to provide a virtual environment to the users, where the web servers 106 are in operable communication with the client computing platforms 104 and server(s) 102. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space/environment are determined by game module 108 is not intended to be limiting. The game module 108 may be configured to express the virtual environment in a more limited, or more rich, manner. For example, views determined for the virtual environment may be selected from a limited set of graphics depicting an event in a given place within the virtual environment. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual environment are contemplated.

Within the instance(s) of the virtual environment executed by game module 108, users may control characters, objects, simulated physical phenomena (e.g., wind, rain, earthquakes, and/or other phenomena), and/or other elements within the virtual environment to interact with the virtual environment and/or each other. The user characters may include avatars. As used herein, the term "user character" may refer to an object (or group of objects) present in the virtual environment that represents an individual user. The user character may be controlled by the user with which it is associated. The user controlled element(s) may move through and interact with the virtual environment (e.g., non-user characters in the virtual environment, other objects in the virtual environment). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual environment.

The users may participate in the instance of the virtual environment by controlling one or more of the available user controlled elements in the virtual environment. Control may be exercised through control inputs and/or commands input by the users through client computing platforms 104. The users may interact with each other through communications exchanged within the virtual environment. Such communications may include one or more of textual chat, instant messages, private messages, voice communications, and/or other communications. Communications may be received and entered by the users via their respective client computing platforms 104. Communications may be routed to and from the appropriate users through server(s) 102 (e.g., through game module 108).

Interactive, electronic social media may include one or more of a social network, a virtual environment, a micro-blogging service, a blog service (or host), a browser-based game, a multi-player mobile game, a file (e.g., image file, video file, and/or other files) sharing service, a messaging service, a message board, a forum, and/or other electronically distributed media that are scalable and enable interaction between the users. Some non-limiting specific examples of interactive, electronic social media may include the micro-blogging service provided by Twitter™, the social network provided by Facebook™, the social network provided by MySpace™, the social network provided by Foursquare®, the virtual world provided by SecondLife®, the massively multi-player online game provided by World of Warcraft®, the file sharing service provided by Flickr®, Blogger, YouTube, PlayStation® Home, Xbox® Live, and/or other interactive electronic social media.

The objective module 110 may be configured to obtain an objective definition of an administrator specified objective to be achieved by users of the game as part of a limited time event. The users' progress toward achieving the objective may be automatically presented to the users individually in a user-specific leaderboard. The objective may require one or more activities in the game associated with the objective to be completed by users. The user's progress toward completing the activities may be automatically presented to users individually in a user-specific leaderboard.

The objective may be a time-limited event within the game space of the online game. Examples of administrator-defined objectives may include at least one of exploring a map, researching a technology or skill, purchasing an in-game item, harvesting a specified type of resource, defeating one or more other players in player-versus-player combat, defeating non-player characters, participating and completing player-versus-environment activities, completing quests, and/or completing an in-game achievement. Other administrator-defined objectives may include occupying a particular area of a virtual environment, cultivate a defined amount and/or variety of a particular product or resource, build a game item, such as a city or building, form an alliance with other users, progress to another level within the game, and/or other any other objective which may be defined by an administrator.

The activity monitoring module 112, may be configured to monitor interactions of the users with the game and/or each other within the game in response to the objective being obtained by the objective module 110. Where the game module 108 has implemented a virtual environment, the activity monitoring module 112 may be configured to monitor interactions of the users with the virtual environment, one or more objects within the virtual environment, and/or each other. This may include monitoring, for a given user, areas the given user views or interacts with or within the game and/or virtual environment, other users the given user interacts with, the nature and/or content of interactions of the given user with other users, activities participated in within the game and/or virtual environment, level, powers, or skill attained in the game associated with various tasks, skills, or events within the game, inventory items obtained in the game, and/or other interactions of the given user with the game, virtual environment and/or other users. Some or all of the information generated by activity monitoring module 112 in monitoring the interactions of the users may be stored. Such storage may occur within user profiles managed by one or more computer program modules.

The activity monitoring module 112 may be configured to determine one or more activity metrics for the users indicating a level of progress toward completing one or more activities. The activity metrics may be based upon the users' progress toward completing the activities defined in the objective definition. The activity monitoring module 112 may be configured to determine a first activity metric value for a first user based upon the first user's progress toward completing a first activity. An objective may have one or more associated activities, whereby the activities are required to be completed before the objective can be accomplished.

The associated activities may be defined by an administrator, or one or more computer program modules may be able to determine the associated activities from the definition of the objective defined by an administrator. As a non-limiting example, the objective may be to complete a quest within the game. To complete the quest the player may be required to obtain an object B to defeat a non-player character C. Object B may be obtained by the user by interacting with the topography within the instance of the game. The object B may be stored within an inventory associated with the user. The definition of the administrator-defined objective may include the requirements to complete a first activity, related to obtaining the object B, and a second activity, related to defeating the non-player character C. In other implementations, the one or more computer programs may be configured to determine, upon an administrator defining an objective as requiring users to complete a quest, that users must obtain an object B in order to defeat non-player character C. The activity monitoring module 112 may be configured to determine a first activity metric value indicating the user's progress toward obtaining object B, and a second activity metric value indicating the user's progress toward defeating non-player character C, in response to the objective being defined. The activity monitoring module 112 may be configured to determine activity metrics for users based on the objects stored within the user's inventory.

Some activities required to be completed to achieve an objective require the user to undertake one or more actions. Such that, individual ones of the one or more activities require users to complete multiple actions defined in the objective definition, such that a third activity requires users to complete a first action and a second action. For example, to obtain an object B, necessary in order to complete a quest, the user may be required to perform actions D and E. The performance of actions D and E may be defined by an administrator as being required to obtain object B. In alternative implementations, the one or more computer program modules may be configured to determine that obtaining object B requires the performance of actions D and E.

The activity monitoring module 112 may be configured to determine a first action metric value and a second action metric value for the first user indicating the first user's progress toward completing the first action and the second action. For example, the first action metric value may be associated with a progress toward performance of action D, and the second action metric value may be associated with a progress toward performance of action E. The activity monitoring module 112 may be configured to determine the third activity metric value indicating the first user's progress toward completing the third activity, based on the first action metric value and the second action metric value. The activity monitoring module 112 may be configured to account for a difference in respective contributions, toward the user's progress toward completing the third activity, from the first action metric value and the second action metric value when determining the third activity metric value.

The objective monitoring 114 module may be configured to determine an objective metric for the users indicating the users' progress toward achieving the objective. The users' progress toward achieving the objective may be based upon the one or more activity metrics for the user. The objective monitoring module 114 may be configured to determine a first objective metric value for the first user based upon the first activity metric value for the first user. The objective monitoring module 114 may be configured to determine a first objective metric value for the first user based on a second activity metric for the first user, such that the first activity metric and the second activity metric may indicate the first user's progress of two otherwise distinct activities, in furtherance of achieving the defined objective.

Different activities, required to be completed to achieve the objective, may have different associated complexities and/or time requirements, providing activities having irregularly weighted contributions toward achieving the objectives. The objective monitoring module 114 may be configured to determine objective metrics for the users in a game space, based on the weighted activity metrics for the users, such that a first user having completed a first activity may have a higher objective metric value than a second user who has completed a second activity and a third activity.

The objective monitoring module 114 may be configured to determine a second objective metric value for a second user. The second objective metric value may be based upon one or more activity metric values for the second use. The objective monitoring module 114 may be configured to determine a hierarchy for the first objective metric value for the first user and the second objective metric value for the second user. The hierarchy of the first objective metric value of the first user and the second objective metric value for the second user providing an indication of which user has progressed further toward achieving the objective. The user with the greater progress toward achieving the objective appearing higher in the hierarchy than a user with less progress toward achieving the objective. The objective monitoring module may be configured to determine the objective metric values for any number of users, and determine a hierarchy for the any number of users.

The objective monitoring module 114 may be configured to determine a set of users that are currently engaged with the game. Being engaged with the game may refer to being logged in to the game, performing some action or interaction within the game within some period of time (e.g., the last 2 minutes), and/or taking some other action indicating ongoing and contemporaneous engagement with the game.

The objective monitoring module 114 may be configured to determine the objective metrics for many users where the users may be required to perform different activities in order to achieve an objective. For example, a first user may be required to complete a first activity and a second activity to achieve an objective, as defined by an administrator. A second user may be required to complete a third activity to achieve the objective. Differences in requirements for the users to achieve the objective may be based on one or more user parameters indicating differences in the users.

The progress presentation module 116 may be configured to effectuate presentation of the objective metric values determined for the users according to a hierarchy of the objective metric values for the users, in response to obtaining the administrator-defined objective. Such presentation may be in the form of a leaderboard presented to the users individually as a user-specific leaderboard. Such presentation may be in response to obtaining the administrator-defined objective, or in response to an indication that the user has started to work toward achieving the administrator-defined objective. The progress presentation module 116 may be configured to effectuate presentation of the first objective metric value determined for the first user, to the first user. Similarly, the progress presentation module 116 may be configured to effectuate presentation of a second objective metric value determined for a second user, to the second user.

The progress presentation module 116 may be configured to effectuate presentation of the first objective metric value determined for the first user and the second objective metric value determined for the second user according to the determined hierarchy of the first objective metric value and the second objective metric value. The progress presentation module 116 may be configured to effectuate presentation of the objective metric values, to the users, according to a hierarchy, as determined by the objective monitoring module 114, together with the objective metric values of one or more other users in the game. The one or more other users, compared in the hierarchy, may be all other users participating in pursuing the objective, a selection of users affiliated with the first user, for example users having an indication that they interact with the first user using electronic social media, users which have formed an alliance or guild within the game space, users having similar demographics, such as geography or affiliations with real-world organizations such as universities or organizations, and/or any other combination of users having one or more like parameters. In some implementations, the users presented in the hierarchy may be users currently engaged with the game, or may be users not currently engaged with the game, or a combination thereof.

The progress presentation module 116 may be configured to effectuate presentation of the first activity metric value determined for the users according to a hierarchy of the first activity metric values determined for the users. Each activity required to be completed to achieve the objective may have an associated leaderboard. Similarly, each action required to be taken to complete an activity may have an associated leaderboard. Each leaderboard may compare the user's objective, activity or action metric value with the metric values of one or more other users.

Figure 2:
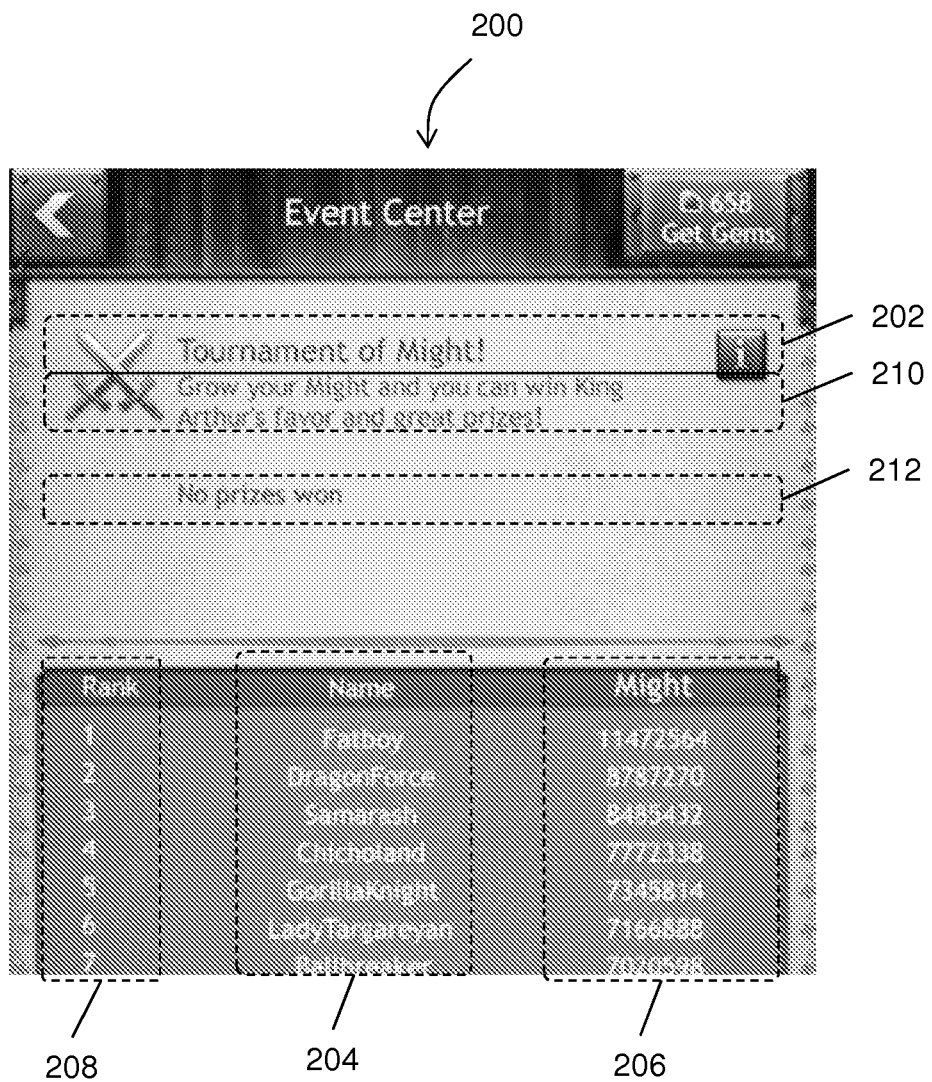
FIG. 2 illustrates a leaderboard provided to users based on in-game events, in accordance with one or more implementations.

FIG. 2 illustrates a leaderboard 200 provided to users based on in-game events, in accordance with one or more implementations. The leaderboard 200 may comprise an objective title 202, providing the user an indication of which objective the leaderboard 200 pertains. The objective may be defined by an administrator, whereby the individual activities and/or actions required to be completed and/or performed by the user are defined and/or determined. For example, as illustrated in FIG. 2, the objective, associated with leaderboard 200, may be defined as a user, or a user's avatar or character, achieving a certain amount of might.

The leaderboard 200 may include a user group 204. The user group may comprise a group of users selected based upon a common characteristic or parameter. Common characteristics or parameters may include each player working toward achieving the same objective, being associated with one another in the game, such as in a guild or alliance, being associated with one another in electronic social media, having a common regional location in the virtual environment, or in the real-world, belonging to a common organization such as a college, business or interest group, and/or any other commonly held characteristic.

The users presented on the leaderboard may have an associated objective metric value 206, indicating each displayed user's progress toward achieving the objective. In the case illustrated in FIG. 2, the leaderboard 200 may comprise an indication of the amount of might obtained by each of the displayed users in the user group 204. The objective metric value 206, determined by the objective metric monitoring module 114 may be based upon one or more activity metric values for the users, and/or action metric values for the users. The leaderboard 200 may present the group of users 204 according to their relative hierarchy, or rank, 208 within the group 204. The group 204 may be a small subset of all users attempting to achieve the objective. Therefore the relative hierarchy, or rank 208, of even the highest user displayed on the leaderboard 200 may be relatively low compared to a group comprising all users. The group of users 204 may be selected based upon an indication that the first user, to whom the leaderboard 200 is presented, has a relatively high within the rank 208 of the group 204. Providing a leaderboard 200 to the first user indicating that the first user has a relatively high rank 208 within the selected group of users 204 incentivizes the first user to continue playing to achieve the objective, improving user retention and monetization.

It would be understood by one of ordinary skill in the art that the leaderboards may not be limited to the embodiment illustrated in FIG. 2. The leaderboard 200 may be associated with an objective, an activity, an action, or a combination thereof.

The motivational module 118 may be configured to effectuate presentation to the first user of a motivational message, wherein the motivational message comprises an indication of the hierarchy of the objective metric value for the first user. The motivational message may provide an indication that the user is near to achieving the objective, has a relatively high objective metric value compared to other users, and/or provide some other indication of the user's progress toward achieving the objective. The motivational module 118 may be further configured to effectuate presentation to the first user of one or more incentives for achieving a relatively high objective metric value in the hierarchy of objective metric values. The motivational module 118 may be configured to effectuate presentation to the first user of one or more incentives for achieving the objective defined by an administrator.

The motivational module 118 may be configured to effectuate presentation to the first user of a motivational message 210 in leaderboard 200. The motivational message 210 may provide an indication of an incentive available to the user for achieving the objective. Alternatively, where the leaderboard 200 relates to activities and/or actions, the motivational message 210 may provide an indication of an incentive for completing an activity or performing an action. The motivational module 118 may be configured to effectuate presentation to the first user of prizes won 212 during the first user's attempt to achieve the objective.

Incentives may be available to the users at various stages of accomplishing the objective. Incentives may be available for reaching the top of the objective leaderboard, being an indication of which user is closest to achieving the objective. Similarly, incentives may be available for reaching the top of each of the activity leaderboards or action leaderboards. Incentives may be available for achieving the objective in the shortest period of time, for reaching the top of a leaderboard in the shortest period of time, for achieving the objective or completing an activity with the fewest actions, or for any other measurable stage in a user's progress toward achieving the objective.

Such incentives may include one or more of virtual items, other amounts of virtual currency, access to areas in the game space that were previously not accessible to the first user, quests in the game space that were previously not available to the first user and/or other incentives to incentivize the first user to keep striving to achieve the objective, complete the activity or perform the action.

Figure 3:
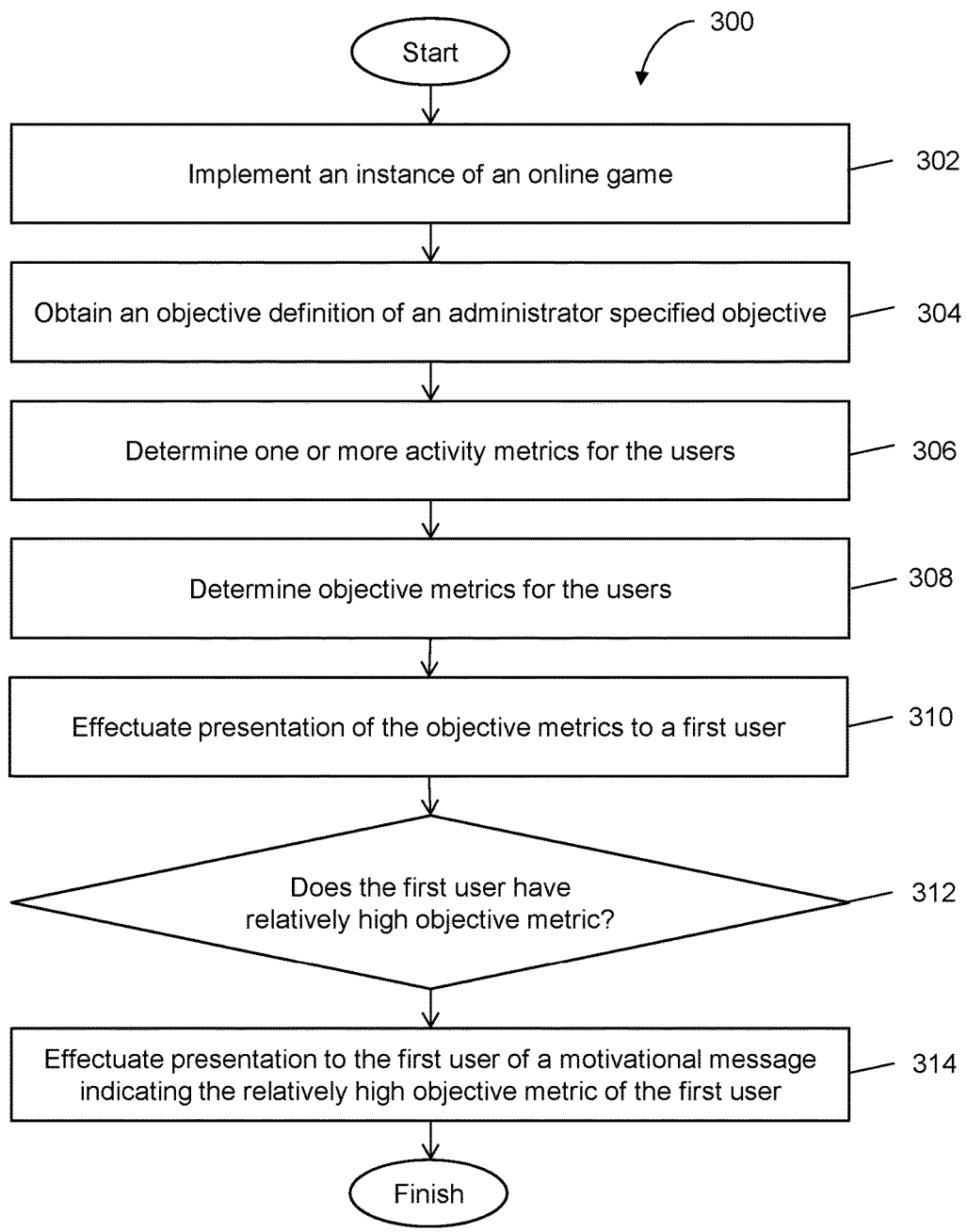
FIG. 3 illustrates a method for providing a leaderboard based upon in-game events within a game space, according to one or more implementations.

FIG. 3 illustrates a method 300 for providing a leaderboard based upon in-game events within a game space implemented on a computer system that includes one or more physical processors. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302 an instance of an online game to facilitate interaction of the users with the game may be implemented. The implemented online game may include an instance of a virtual environment having a 2-dimensional or 3-dimensional topography, and one or more objects within the topography. Users may interact with the topography and/or the one or more objects within the topography. Operation 302 may be performed by a game module that is the same as or similar to game module 108, in accordance with one or more implementations.

At an operation 304 an objective definition of an administrator specified objective may be obtained. The objective may be achieved by users of the game as part of a limited time event. The objective may require one or more activities in the game associated with the objective to be completed by users. Operation 304 may be performed by an objective module that is the same as or similar to objective module 110, in accordance with one or more implementations.

At an operation 306 one or more activity metrics for the users based upon the users' progress toward completing the activities defined in the objective definition may be determined. Activity metrics may be determined such that a first activity metric value for a first user, based upon the first user's progress toward completing a first activity, may be determined. A second activity metric value for the first user, based upon the first user's progress toward completing a second activity may be determined. Individual ones of the one or more activities may require users to complete multiple actions defined in the objective definition, such that a third activity requires users to complete a first action and a second action. Operation 306 may be performed by an activity monitoring module that is the same as or similar to activity monitoring module 112, in accordance with one or more implementations.

At an operation 308 an objective metric for the users indicating the users' progress toward achieving the objective may be determined. The objective metrics may be based upon the one or more activity metrics for the users, such that a first objective metric value for the first user based upon the first activity metric value for the first user may be determined. In some implementations, at an operation 308, a second objective metric value for a second user, wherein the second objective metric value is based upon one or more activity metric values for the second user, may be determined. Operation 308 may be performed by an objective monitoring module that is the same as or similar to objective monitoring module 114, in accordance with one or more implementations.

In some implementations hierarchy for the first objective metric value for the first user and the second objective metric value for the second user may be determined. Such determination may be performed by an objective monitoring module that is the same as or similar to objective monitoring module 114, in accordance with one or more implementations.

At an operation 310, presentation of the objective metric values determined for the users according to a hierarchy of the objective metric values for the users may be effectuated. The presentation of the objective metric values may be effectuated for individual users, such that the presentation to a first user is different than the presentation to the second user. For example, presentation of the first objective metric value determined for the first user and the second objective metric value determined for the second user may be effectuated. Such objective metric values may be presented according to the determined hierarchy of the first objective metric value and the second objective metric value. The presentation of the relative hierarchies to the first user may include an indication of the objective metric values for a set of one or more other users. The set of users may be selected based on one or more characteristics shared with the first user. The set of users may be selected such that the first user has an objective metric value that is relatively high compared to the objective metric values of set of users, allowing the first user to appear relatively high in the presentation of objective metric values. Having the first user appearing relatively high in the presentation of objective metric values increases the user's incentive to keep playing to achieve the highest position, thereby improving player retention and monetization. Operation 310 may be performed by a presentation module that is the same as or similar to presentation module 116, in accordance with one or more implementations.

In some implementations, presentation of the first activity metric value determined for the users according to a hierarchy of the first activity metric values determined for the users, may be effectuated. Such a presentation may be performed by a presentation module that is the same as or similar to presentation module 116, in accordance with one or more implementations.

Presentation of an objective activity metric value or a first activity metric value of the first user, and the set of users, according to a hierarchy of objective activity metric values, or activity metric values, respectively, may be in the form of a leaderboard. The leaderboard may be tailored to the first user and presented to the first user.

At an operation 312, a determination of whether the first user has a relatively high objective metric value, compared to the set of users, is made. Operation 312 may be performed by an objective monitoring module that is the same as or similar to objective monitoring module 114, in accordance with one or more implementations.

At an operation 314, in response to a determination, at operation 312, that the first user has a relatively high objective metric value compared to the set of users, presentation to the first user of a motivational message may be effectuated. The motivation message may comprise an indication of the hierarchy of the objective metric value for the first user. Operation 314 may be performed by a motivational module that is the same as or similar to motivational module 118, in accordance with one or more implementations.

Presentation, to the first user of one or more incentives for achieving a relatively high objective metric value in the hierarchy of objective metric values, may be effectuated. Similarly, presentation, to the first user of one or more incentives for achieving the objective defined by an administrator, may be effectuated. The incentives may include one or more virtual items, other amounts of virtual currency, access to areas in the game space that were previously not accessible to the first user, quests in the game space that were previously not available to the first user, and/or any other incentive to incentivize the user to continue playing the game to achieve the objective. Such presentation may be performed by a motivational module that is the same as or similar to motivational module 118, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for providing leaderboards within a game space, the system comprising:
    one or more processors configured by machine-readable instructions to:
        execute an instance of an online game, and to implement the instance to facilitate interaction by users with the online game, wherein the users include a first user and a second user;
        obtain an objective definition of an administrator-specified objective to be achieved by users of the online game as part of a limited time event within the online game, wherein completion of the objective requires multiple activities to be performed by users;
        determine the users' progress toward completing individual ones of the multiple activities, such that the first user's progress toward completing a first activity independent of the first user's progress toward other ones of the activities is determined, and such that the second user's progress toward completing the first activity independent of the second user's progress toward other ones of the activities is determined;
        determine activity metric values for the users based upon the determined users' progress, such that a first activity metric value is determined for the first user based upon the determined first user's progress, and such that a second activity metric value is determined for the second user based upon the determined second user's progress;
        determine objective metric values for the users indicating the users' progress toward achieving the objective, based upon the activity metric values for the users, such that a first objective metric value for the first user is determined based upon the first activity metric value for the first user, and such that a second objective metric value for the second user is determined based upon the second activity metric value for the second user;
        effectuate presentation of a first leaderboard for the first activity, the first leaderboard including for presentation:
            a first identifier and the first activity metric value for the first user in accordance with a relative ranking of the first activity metric value among the determined activity metric values; and
        effectuate presentation of a second leaderboard for the objective metric values, the second leaderboard including for presentation:
            a second identifier and the second objective metric value for the second user, in accordance with a relative ranking of the second objective metric value among the determined objective metric values.

2. The system of claim 1, wherein individual ones of the multiple activities require users to complete multiple actions defined in the objective definition, such that a third activity requires users to complete a first action and a second action.

3. The system of claim 2, wherein the one or more processors are further configured by machine-readable instructions to:
    determine a first action metric value and a second action metric value for the first user indicating the first user's progress toward completing the first action and the second action; and
    determine the third activity metric value indicating the first user's progress toward completing the third activity, based on the first action metric value and the second action metric value.

4. The system of claim 1, wherein the one or more processors are further configured by machine-readable instructions to:
    effectuate presentation to the first user of a motivational message, wherein the motivational message comprises an indication of the relative ranking of the determined activity metric values and/or the relative ranking of the determined objective metric values.

5. The system of claim 4, wherein the one or more processors are further configured by machine-readable instructions to:
    effectuate presentation to the first user of one or more incentives for achieving a relatively high activity metric value in the relative ranking of the determined activity metric values.

6. The system of claim 5, wherein the incentives include one or more of virtual items, amounts of virtual currency, access to areas in the game space that were previously not accessible to the first user, or access to quests in the game space that were previously not available to the first user.

7. The system of claim 1, wherein the one or more processors are further configured by machine-readable instructions to:
effectuate presentation to the first user of one or more incentives for achieving the administrator-specified objective.

8. The system of claim 7, wherein the incentives include one or more of virtual items, amounts of virtual currency, access to areas in the game space that were previously not accessible to the first user, or access to quests in the game space that were previously not available to the first user.

9. The system of claim 1, wherein the one or more processors are further configured by machine-readable instructions to:
determine the relative ranking of the determined objective metric values based on the determined activity metric values for the users.

10. A method for providing leaderboards within a game space, the method being implemented on a computer system that includes one or more physical processors, the method comprising:
implementing an instance of an online game to facilitate interaction of the users with the online game, wherein the users include a first user and a second user;
obtaining an objective definition of an administrator-specified objective to be achieved by users of the online game as part of a limited time event within the online game, wherein completion of the objective requires multiple activities to be performed in the online game, the multiple activities being associated with the objective to be completed by users;
determining the users' progress toward completing individual ones of the multiple activities, such that the first user's progress toward completing a first activity independent of the first user's progress toward other ones of the activities is determined and such that the second user's progress toward completing the first activity independent of the second user's progress toward other ones of the activities is determined;
determining activity metric values for the users based upon the determined users' progress, such that a first activity metric value is determined for the first user based upon the determined first user's progress, and such that a second activity metric value is determined for the second user based upon the determined second user's progress;
determining objective metric values for the users indicating the users' progress toward achieving the objective, based upon the activity metric values for the users, such that a first objective metric value is determined for the first user based upon the first activity metric value for the first user, and such that a second objective metric value is determined for the second user based upon the second activity metric value for the second user; and,
effectuating presentation of a first leaderboard for the first activity, the first leaderboard including for presentation:
a first identifier and the first activity metric value for the first user in accordance with a relative ranking of the first activity metric value among the determined activity metric values; and
effectuating presentation of a second leaderboard for the objective metric values, the second leaderboard including for presentation:
a second identifier and the second objective metric value for the second user in accordance with a relative ranking of the second objective metric value among the determined objective metric rankings.

11. The method of claim 10, wherein individual ones of the multiple activities require users to complete multiple actions defined in the objective definition, such that a third activity requires users to complete a first action and a second action.

12. The method of claim 11, further comprising:
determining a first action metric value and a second action metric value for the first user indicating the first user's progress toward completing the first action and the second action; and
determining the third activity metric value indicating the first user's progress toward completing the third activity, based on the first action metric value and the second action metric value.

13. The method of claim 10, further comprising:
effectuating presentation to the first user of a motivational message, wherein the motivational message comprises an indication of the relative ranking of the determined activity metric values and/or the relative ranking of the determined objective metric values.

14. The method of claim 13, further comprising:
effectuating presentation to the first user of one or more incentives for achieving a relatively high activity metric value in the relative ranking of the determined activity metric values.

15. The method of claim 14, wherein the incentives include one or more of virtual items, amounts of virtual currency, access to areas in the game space that were previously not accessible to the first user, or access to quests in the game space that were previously not available to the first user.

16. The method of claim 10, further comprising:
effectuating presentation to the first user of one or more incentives for achieving the administrator-specified objective.

17. The method of claim 16, wherein the incentives include one or more of virtual items, amounts of virtual currency, access to areas in the game space that were previously not accessible to the first user, or access to quests in the game space that were previously not available to the first user.

18. The system of claim 10, further comprising:
determining the relative ranking of the determined objective metric values based on the determined activity metric values for the users.

* * * * *